(12) United States Patent
Huang et al.

(10) Patent No.: US 9,950,623 B2
(45) Date of Patent: Apr. 24, 2018

(54) VEHICULAR PROJECTION SYSTEM

(71) Applicant: PRIMAX ELECTRONICS LTD., Taipei (TW)

(72) Inventors: Chien-Chang Huang, Taipei (TW); Ying-Che Tseng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/332,214

(22) Filed: Oct. 24, 2016

(65) Prior Publication Data

US 2018/0037118 A1 Feb. 8, 2018

(30) Foreign Application Priority Data

Aug. 5, 2016 (TW) .............................. 105124970 A (51) Int. Cl.
*B60K 37/02* (2006.01)
*G02B 27/01* (2006.01)
*G01C 21/36* (2006.01)

(52) U.S. Cl.
CPC .......... *B60K 37/02* (2013.01); *G02B 27/0101* (2013.01); *B60K 2350/1064* (2013.01); *B60K 2350/1096* (2013.01); *B60K 2350/2052* (2013.01); *G01C 21/367* (2013.01); *G02B 2027/0138* (2013.01); *G02B 2027/0141* (2013.01)

(58) Field of Classification Search
CPC ............ B60K 37/02; B60K 2350/1064; B60K 2350/1096; B60K 2350/2052; G02B 27/0101; G02B 2027/0141; G02B 2027/0138; G01C 21/367
See application file for complete search history.

(56) References Cited

U.S. PATENT DOCUMENTS

| | | | | |
|---|---|---|---|---|
| 2003/0169491 | A1* | 9/2003 | Bender | G02B 27/0101 359/356 |
| 2008/0238814 | A1* | 10/2008 | Ishikawa | G02B 27/0101 345/7 |
| 2009/0005961 | A1* | 1/2009 | Grabowski | G01C 21/365 701/532 |

(Continued)

*Primary Examiner* — Andrew Sasinowski
(74) *Attorney, Agent, or Firm* — Kirton McConkie; Evan R. Witt (57) ABSTRACT

A vehicular projection system includes plural information collectors, a time-division multiplexing device and a projection mechanism. The plural information collectors are used for outputting driving information. The time-division multiplexing device includes plural wireless transmission modules. The time-division multiplexing device determines the transmitting sequence of plural information collectors according to the receiving sequence of wireless transmission requests from the plural information collectors. Moreover, the time-division multiplexing device determines the suitable wireless transmission modules according to the file properties of the driving information and the wireless transmission capabilities of the plural information collectors. Since the plural information collectors can simultaneously transmit driving information to the time-division multiplexing device through different wireless transmission modules, the wireless transmission efficiency is enhanced.

10 Claims, 6 Drawing Sheets

(56) References Cited

U.S. PATENT DOCUMENTS

| | | | |
|---|---|---|---|
| 2009/0153962 A1* | 6/2009 | Okada | G02B 27/0101 |
| | | | 359/485.02 |
| 2009/0213037 A1* | 8/2009 | Schon | G02B 27/01 |
| | | | 345/7 |
| 2013/0145297 A1* | 6/2013 | Ricci | G06F 9/54 |
| | | | 715/765 |
| 2016/0003636 A1* | 1/2016 | Ng-Thow-Hing | H04N 7/188 |
| | | | 701/26 |
| 2016/0004075 A1* | 1/2016 | Ando | G03B 21/2033 |
| | | | 353/13 |
| 2016/0307349 A1* | 10/2016 | Sato | G09G 5/14 |

\* cited by examiner

VEHICULAR PROJECTION SYSTEM

FIELD OF THE INVENTION

The present invention relates to a projection system, and more particularly to a vehicular projection system for a vehicle.

BACKGROUND OF THE INVENTION

With the development of network information and associated technologies, a navigation device or the navigation software in a mobile device almost become a driving must. However, if the driver distracts to look down or turn to watch the navigation information that is shown on the navigation device or the navigation software in the driving process, the driving safety is adversely affected and the life safety is possibly endangered. For reducing the traffic safety hazards of turning to watch the driving dashboard or the navigation device while watching the traffic condition, a head-up display is introduced into the market. The head-up display is shown on a windshield of a vehicle. Since a portion of the driving information of the driving dashboard is shown on the windshield according to a projecting technology, the driver can simultaneously watch the traffic condition and a portion of the driving information of the driving dashboard through the windshield.

Since the head-up displays are expensive, only few luxury vehicles have the built-in head-up displays. The other vehicles are optionally equipped with the head-up display at their own expense. In other words, it is difficult to popularize the use of head-up display. Moreover, the existing head-up display only provide the navigation information that is shown on the navigation device or the navigation software. As known, the driving information provided by the existing head-up display is usually insufficient. Consequently, the head-up display is not favored by many drivers.

Taiwanese Patent Publication No. 200848703 discloses a navigation assistance using a camera. A navigation device and a camera cooperate with each other to superimpose the navigation information on a captured image of the camera. Through the captured image, the driver can simultaneously watch the traffic condition and the navigation information. However, the display device of the camera cannot show sufficient traffic information, navigation information and driving safety prompt information on the same captured image. For example, the driving speed, the gearshift status, the gasoline capacity and other driving status information of the vehicle cannot be shown on the captured image. Under this circumstance, the driver has to look down the dashboard to realize the driving information.

Taiwanese Patent No. 1521484 discloses a device for simultaneously showing the navigation information and the driving safety prompt information. Under control of a host, the information on a camera unit, the information on a navigation unit and the information on a driving safety prompt unit are collaboratively shown on a display unit. Consequently, the traffic condition image, the navigation information, the front car safety distance and other required information are simultaneously shown on the display unit. Through the display unit, the driver can realize the real-time traffic condition image, the navigation information and the driving safety information. Since the driver does not need to turn to different positions to watch the driving information, the driving disaster caused by distraction is reduced and the driving safety is enhanced.

With increasing development of wireless transmission technologies, the above purpose can be achieved by using the wireless transmission technologies. Take the patent of Taiwanese Patent No. 1521484 as an example. The display unit, the camera unit, the navigation unit and the audio prompt unit are wirelessly connected with the host according to wireless transmission technologies. Consequently, the display unit, the camera unit, the navigation unit and the audio prompt unit are placed on the suitable positions without being restricted by the connecting wires. That is, these components can be easily installed. However, during the wireless transmission process, the image shown on the display unit is suffered from a display lag problem. For example, if the navigation unit wirelessly transmits the navigation information to the host while the camera unit wirelessly transmits the traffic condition image to the host, the host firstly performs the wireless transmission of the traffic condition image and then performs the wireless transmission of the navigation information. After the navigation information is transmitted to the host, the host will show the traffic condition image and the navigation information on the display unit. That is, the image is shown on the display unit after all data have been transmitted to the host. Consequently, the display lag problem occurs.

Therefore, there is a need of providing a vehicular projection system for solving the display lag problem.

SUMMARY OF THE INVENTION

An object of the present invention provides a vehicular projection system for solving the display lag problem.

Another object of the present invention provides a vehicular projection system using a wireless transmission technology to generate a real-time layout image.

In accordance with an aspect of the present invention, there is provided a vehicular projection system for a vehicle. The vehicular projection system includes a first information collector, a second information collector, a time-division multiplexing device and a projection mechanism. The first information collector issues a first driving information and a first wireless transmission request corresponding to the first driving information. The second information collector issues a second driving information and a second wireless transmission request corresponding to the second driving information. The time-division multiplexing device is wirelessly connected with the first information collector and the second information collector, and determines a wireless transmission method of at least one of the first driving information and the second driving information according to a result of detecting the first wireless transmission request and the second wireless transmission request. After the first driving information and the second driving information are received, the time-division multiplexing device generates a layout image according to the first driving information and the second driving information and outputs the layout image. The projection mechanism is wirelessly connected with the time-division multiplexing device, and projects the layout image onto a glass plate of the vehicle. The layout image contains the first driving information and the second driving information.

From the above descriptions, the present invention provides the vehicular projection system. The time-division multiplexing device determines the transmitting sequence of plural information collectors according to the receiving sequence of the wireless transmission requests from the plural information collectors. Then, the control unit determines the suitable wireless transmission modules according to the file properties of the driving information to be transmitted and the wireless transmission capabilities of the plural information collectors. That is, the plural information collectors can simultaneously transmit driving information to the time-division multiplexing device through different wireless transmission modules. Consequently, the wireless transmission is performed efficiently. In case that the best wireless transmission module (with the highest transmission speed) is occupied when plural wireless transmission modules simultaneously perform the wireless transmission, the second best wireless transmission module is assigned to perform the wireless transmission. When the best wireless transmission module is no longer occupied, the second best wireless transmission module is switched to the best wireless transmission module to perform the wireless transmission. Consequently, the wireless transmission efficiency is enhanced. Moreover, since the layout image watched by the driver is close to the real-time image, the vehicular projection system can effectively solve the display lag problem.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional luminous keyboard, the present invention provides an improved a vehicular projection system.

Figure 1:
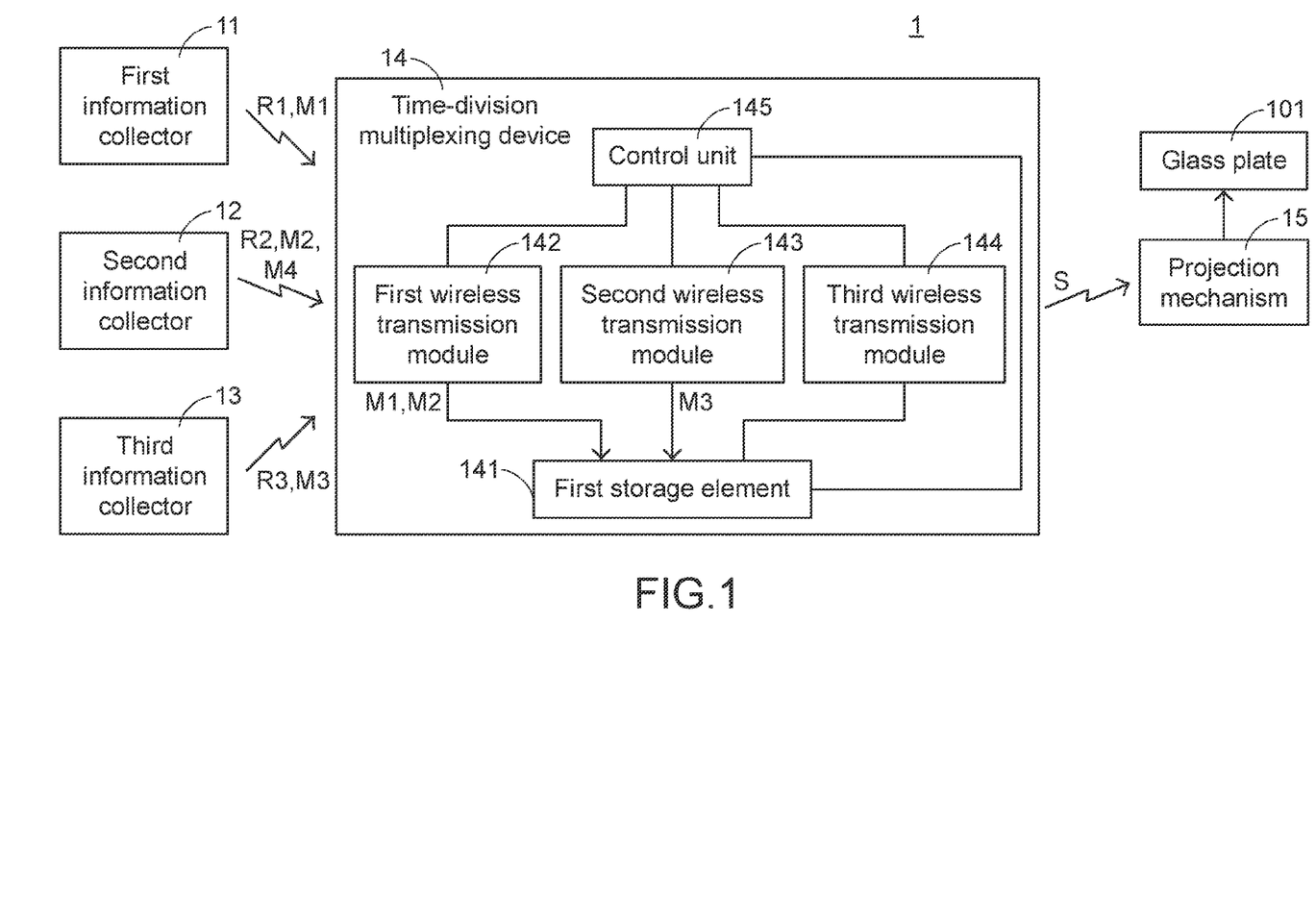
FIG. 1 is a schematic functional block diagram illustrating a vehicular projection system according to an embodiment of the present invention.

FIG. 1 is a schematic functional block diagram illustrating a vehicular projection system according to an embodiment of the present invention. The vehicular projection system 1 is installed in a vehicle (not shown). In this embodiment, the vehicular projection system 1 comprises a first information collector 11, a second information collector 12, a third information collector 13, a time-division multiplexing device 14 and a projection mechanism 15. The first information collector 11 is wirelessly connected with the time-division multiplexing device 14. Moreover, the first information collector 11 is used for acquiring a first driving information M1 and generating a first wireless transmission request R1 corresponding to the first driving information M1. The second information collector 12 is wirelessly connected with the time-division multiplexing device 14. Moreover, the second information collector 12 is used for acquiring a second driving information M2 and generating a second wireless transmission request R2 corresponding to the second driving information M2. Like the first information collector 11 and the second information collector 12, the third information collector 13 is wirelessly connected with the time-division multiplexing device 14. Moreover, the third information collector 13 is used for acquiring a third driving information M3 and generating a third wireless transmission request R3 corresponding to the third driving information M3.

The time-division multiplexing device 14 is disposed within the vehicle. Moreover, the time-division multiplexing device 14 is wirelessly connected with the first information collector 11, the second information collector 12 and the third information collector 13. The time-division multiplexing device 14 has three functions. Firstly, the time-division multiplexing device 14 periodically detects whether the first wireless transmission request R1, the second wireless transmission request R2 or the third wireless transmission request R3 is received at a first predetermined time interval. Secondly, the time-division multiplexing device 14 determines a method of wirelessly transmitting at least one of the first driving information M1, the second driving information M2 and the third driving information M3 according to the detecting result. Thirdly, after the at least one of the first driving information M1, the second driving information M2 and the third driving information M3 is received, the time-division multiplexing device 14 generates a layout image S according to the at least one of the first driving information M1, the second driving information M2 and the third driving information M3 and transmits the layout image S to the projection mechanism 15. The projection mechanism 15 is wirelessly connected with the time-division multiplexing device 14. Moreover, the projection mechanism 15 is used for projecting the layout image S onto a glass plate 101 of the vehicle. In an embodiment, the layout image S contains the first driving information M1, the second driving information M2 and the third driving information M3.

The inner structures of the components of the time-division multiplexing device 14 will be described in more details as follows. The time-division multiplexing device 14 comprises a first storage element 141, a first wireless transmission module 142, a second wireless transmission module 143, a third wireless transmission module 144 and a control unit 145. The first driving information M1, the second driving information M2 and the third driving information M3 are temporarily stored in the first storage element 141. The first wireless transmission module 142 is connected with the first storage element 141. Moreover, the first wireless transmission module 142 receives the first driving information M1 and the second driving information M2 according to a first wireless transmission technology. The second wireless transmission module 143 is connected with the first storage element 141. Moreover, the second wireless transmission module 143 receives the second driving information M2 or the third driving information M3 according to a second wireless transmission technology. The third wireless transmission module 144 is connected with the first storage element 141. Moreover, the second wireless transmission module 143 receives the second driving information M2 according to a third wireless transmission technology. In an embodiment, the first wireless transmission module 142 is a Wi-Fi transmission module, the second wireless transmission module 143 is a 3G/4G transmission module, and the third wireless transmission module 144 is a Bluetooth transmission module.

The control unit 145 is connected with the first storage element 141, the first wireless transmission module 142, the second wireless transmission module 143 and the third wireless transmission module 144. The control unit 145 makes a strategic decision according to the practical condition and controls the operations of the time-division multiplexing device 14. Particularly, the control unit 145 determines the method of wirelessly transmitting the first driving information M1, the second driving information M2 and the third driving information M3 according to the sequences of receiving the first wireless transmission request R1 by the first wireless transmission module 142, receiving the second wireless transmission request R2 by the second wireless transmission module 143 and receiving the third wireless transmission request R3 by the third wireless transmission module 144, the file property of the first driving information M1, the file property of the second driving information M2, the file property of the third driving information M3, the wireless transmission capability information of the first wireless transmission module 142, wireless transmission capability information of the second wireless transmission module 143 and the wireless transmission capability information of the third wireless transmission module 144. The detailed operation will be described later.

Figure 2:
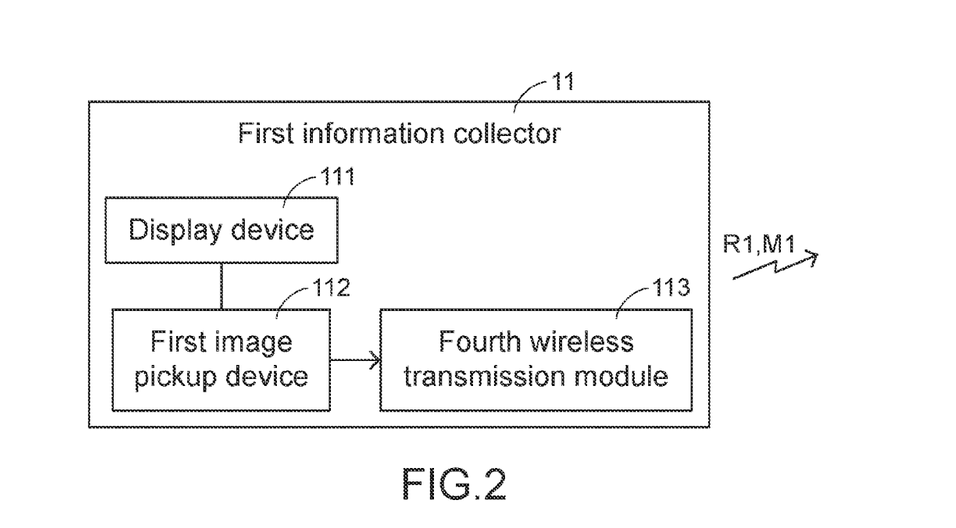
FIG. 2 is a schematic functional block diagram illustrating the first information collector of the vehicular projection system according to the embodiment of the present invention.

Please refer to FIGS. 1 and 2. FIG. 2 is a schematic functional block diagram illustrating the first information collector of the vehicular projection system according to the embodiment of the present invention. The first information collector 11 comprises a display device 111, a first image pickup device 112 and a fourth wireless transmission module 113. The display device 111 is disposed within the vehicle. The driving status information of the vehicle is shown on the display device 111. The first image pickup device 112 is located near the display device 111. The first image pickup device 112 is used for shooting the display device 111 and acquiring the image corresponding to the driving status information. The image containing the driving status information is defined as the first driving information M1. The fourth wireless transmission module 113 is connected with the first image pickup device 112 and wirelessly connected with the first wireless transmission module 142. Moreover, the fourth wireless transmission module 113 issues the first wireless transmission request R1 and the first driving information M1 to the first wireless transmission module 142 according to the first wireless transmission technology. In an embodiment, the display device 111 is a driving dashboard of the vehicle. The driving status information contains a driving speed, a cabinet temperature, a gearshift status, a gasoline capacity or any other appropriate status information of the vehicle. The first image pickup device 112 is a video camera.

Figure 3:
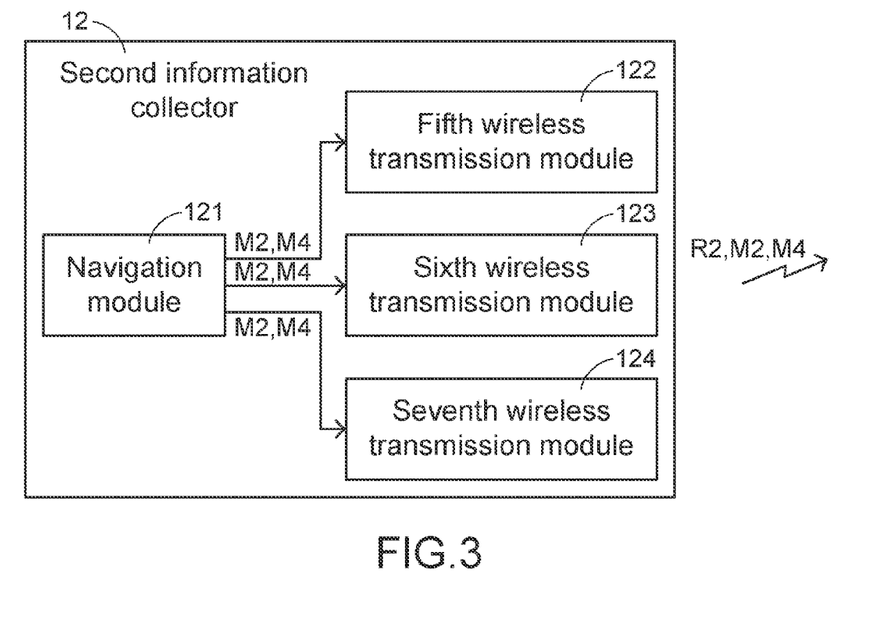
FIG. 3 is a schematic functional block diagram illustrating the second information collector of the vehicular projection system according to the embodiment of the present invention.

Please refer to FIGS. 1 and 3. FIG. 3 is a schematic functional block diagram illustrating the second information collector of the vehicular projection system according to the embodiment of the present invention. The second information collector 12 comprises a navigation module 121, a fifth wireless transmission module 122, a sixth wireless transmission module 123 and a seventh wireless transmission module 124. The navigation module 121 is connected to the internet to acquire the navigation information about the present location of the vehicle. The navigation information is defined as the second driving information M2. The fifth wireless transmission module 122 is connected with the navigation module 121 and wirelessly connected with the first wireless transmission module 142. Moreover, the fifth wireless transmission module 122 issues the second wireless transmission request R2 and the second driving information M2 to the first wireless transmission module 142 according to the first wireless transmission technology. The sixth wireless transmission module 123 is connected with the navigation module 121 and wirelessly connected with the second wireless transmission module 143. Moreover, the sixth wireless transmission module 123 issues the second wireless transmission request R2 and the second driving information M2 to the second wireless transmission module 143 according to the second wireless transmission technology. The seventh wireless transmission module 124 is connected with the navigation module 121 and wirelessly connected with the third wireless transmission module 144. Moreover, the seventh wireless transmission module 124 issues the second wireless transmission request R2 and the second driving information M2 to the third wireless transmission module 144 according to the third wireless transmission technology.

In an embodiment, the second information collector 12 is a smart phone, a tablet computer or any other appropriate mobile device. The fifth wireless transmission module 122 is a Wi-Fi transmission module, the sixth wireless transmission module 123 is a 3G/4G transmission module, and the seventh wireless transmission module 124 is a Bluetooth transmission module. Moreover, the navigation module 121 is a navigation application program installed in the mobile device. The examples of these components are presented herein for purpose of illustration and description only. In another embodiment, the second information collector is a navigation device. More preferably, when the navigation application program installed in the mobile device is executed, the real-time traffic news from the network is outputted as a fourth driving information M4 in a text form.

Figure 4:
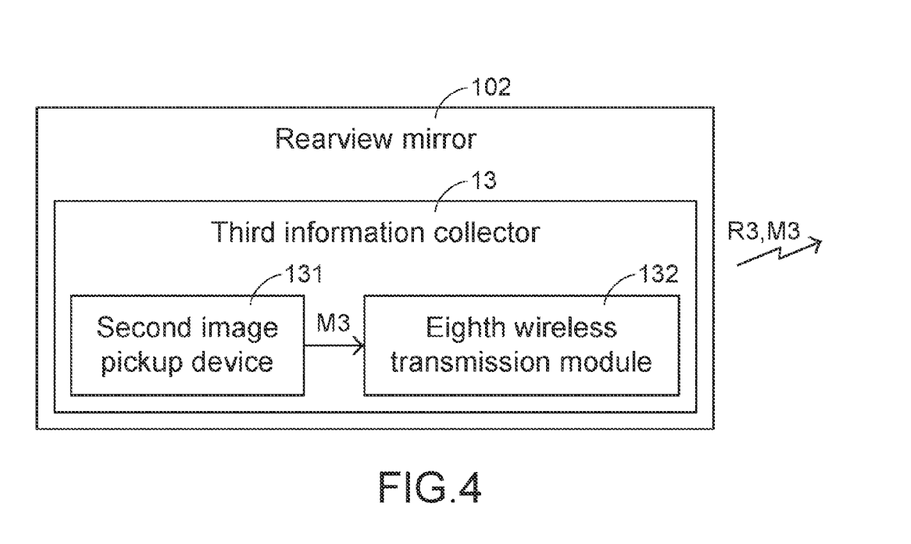
FIG. 4 is a schematic functional block diagram illustrating the third information collector of the vehicular projection system according to the embodiment of the present invention.

Please refer to FIGS. 1 and 4. FIG. 4 is a schematic functional block diagram illustrating the third information collector of the vehicular projection system according to the embodiment of the present invention. The third information collector 13 comprises a second image pickup device 131 and an eighth wireless transmission module 132. The second image pickup device 131 is installed on a rearview mirror 102 of the vehicle. The second image pickup device 131 is used for capturing the rearview mirror image. The eighth wireless transmission module 132 is connected with the second image pickup device 131 and wirelessly connected with the second wireless transmission module 143. Moreover, the eighth wireless transmission module 132 issues the third wireless transmission request R3 and the third driving information M3 to the second wireless transmission module 143 according to the second wireless transmission technology. The rearview mirror image is defined as the third driving information M3. In an embodiment, the second image pickup device 131 is a video camera, and the eighth wireless transmission module 132 is a 3G/4G transmission module.

Figure 5:
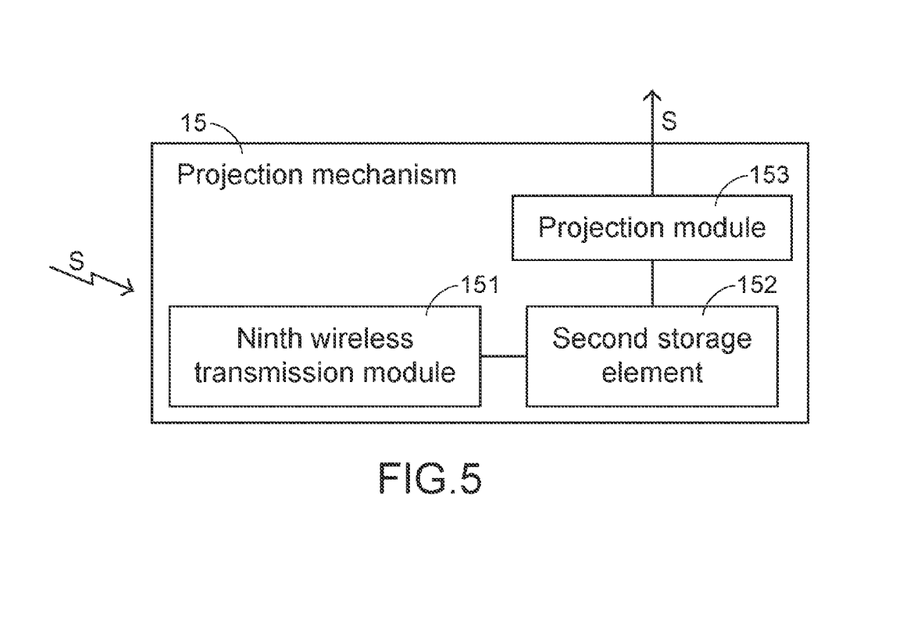
FIG. 5 is a schematic functional block diagram illustrating the projection mechanism of the vehicular projection system according to the embodiment of the present invention.

Please refer to FIGS. 1 and 5. FIG. 5 is a schematic functional block diagram illustrating the projection mechanism of the vehicular projection system according to the embodiment of the present invention. The projection mechanism 15 comprises a ninth wireless transmission module 151, a second storage element 152 and a projection module 153. The ninth wireless transmission module 151 is wirelessly connected with the time-division multiplexing device 14. Moreover, the ninth wireless transmission module 151 receives the layout image S according to a wireless transmission technology. The second storage element 152 is connected with the ninth wireless transmission module 151. The layout image S is stored in the second storage element 152. The projection module 153 is connected with the second storage element 152. The projection module 153 is used for projecting the layout image S on the glass plate 101. Consequently, the driver can watch both of the traffic condition and the layout image S while driving the vehicle.

Figure 6A:
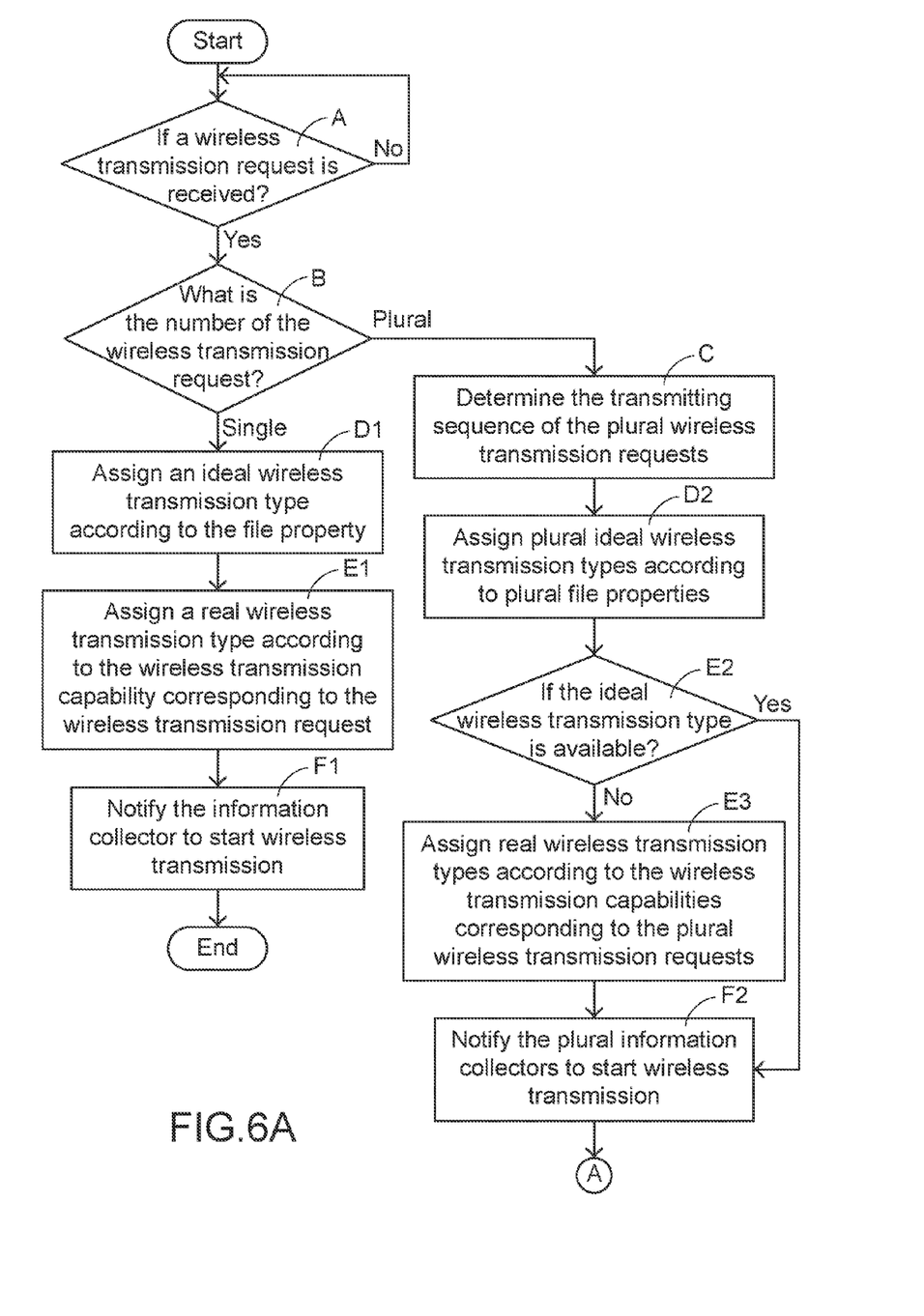
FIGS. 6A and 6B schematically illustrate a flowchart of a method of operating the vehicular projection system according to the embodiment of the present invention.
Figure 6B:
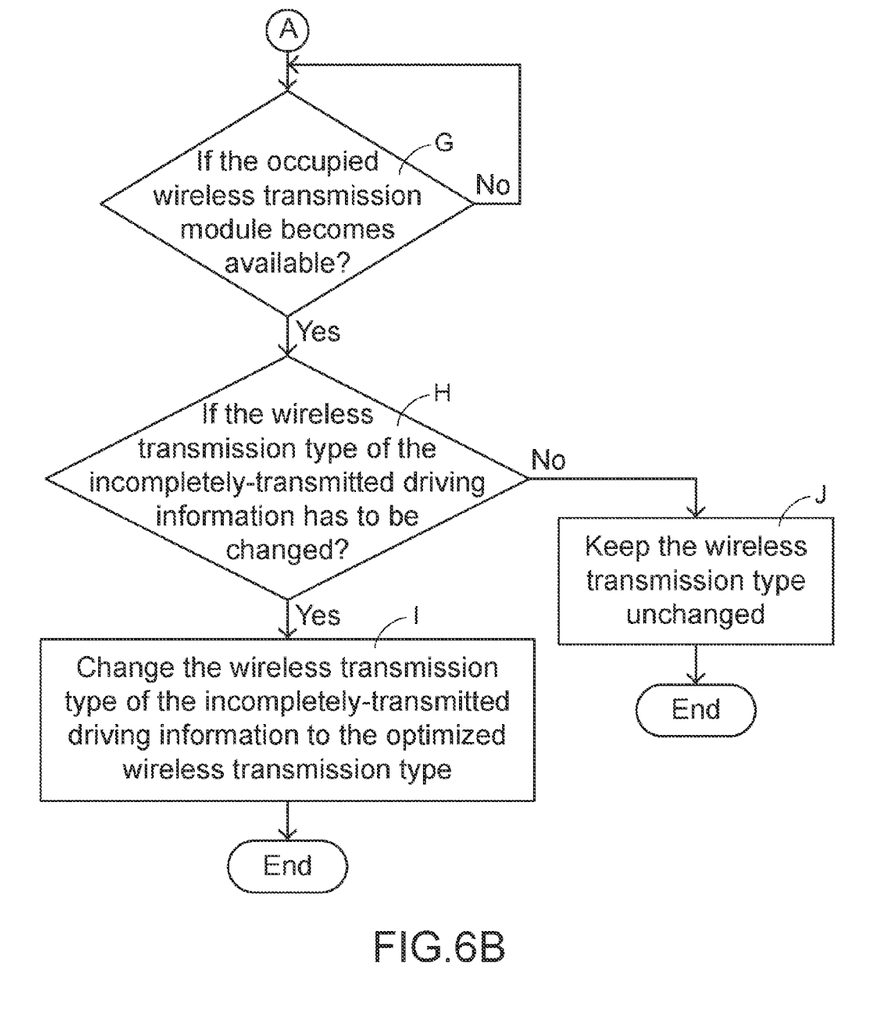

An operating method of the vehicular projection system 1 will be described in more details as follows. Please refer to FIGS. 1, 6A and 6B. FIGS. 6A and 6B schematically illustrate a flowchart of a method of operating the vehicular projection system according to the embodiment of the present invention. The operations of the control unit 145 will be described as follows. The control unit 145 performs the following steps.

In a step A, the control unit detects whether a wireless transmission request is received.

In a step B, the control unit judges the number of the received wireless transmission request.

In a step C, the transmitting sequence of the plural wireless transmission requests is determined.

In a step D1, an ideal wireless transmission type is assigned according to the file property.

In a step E1, a real wireless transmission type is assigned according to the wireless transmission capability corresponding to the wireless transmission request.

In a step D2, plural ideal wireless transmission types are assigned according to plural file properties.

In a step E2, the control unit judges whether the ideal wireless transmission type is available.

In a step E3, real wireless transmission types are assigned according to the wireless transmission capabilities corresponding to the plural wireless transmission requests.

In a step F1, the control unit notifies the information collector to start wireless transmission.

In a step F2, the control unit notifies the plural information collectors to start wireless transmission.

In a step G the control unit judges whether the occupied wireless transmission module becomes available.

In a step H, the control unit judges whether the wireless transmission type of the incompletely-transmitted driving information has to be changed.

In a step I, the wireless transmission type of the incompletely-transmitted driving information is changed to the optimized wireless transmission type.

In a step J, the wireless transmission type is kept unchanged.

If no wireless transmission request is received in the step A, the step A is repeatedly done. Whereas, if any wireless transmission request is received in the step A, the step B is performed. If the control unit judges that the number of the received wireless transmission request is 1 in the step B, the step D1 is performed. Whereas, if the control unit judges that the number of the received wireless transmission request is larger than 1 in the step B, the step C is performed. If the control unit judges that the ideal wireless transmission type is available in the step E2, the step F2 is performed. Whereas, if control unit judges that the ideal wireless transmission type is not available in the step E2, the step E3 is performed. If the control unit judges that the occupied wireless transmission module is available in the step G the step H is performed. Whereas, if the control unit judges that the occupied wireless transmission module is not available in the step G, the step G is repeatedly done. If the control unit judges that the wireless transmission type of the incompletely-transmitted driving information has to be changed in the step H, the step I is performed. Whereas, if the control unit judges that the wireless transmission type of the incompletely-transmitted driving information needs to be kept ubchanged in the step H, the step J is performed.

First of all, the control unit 145 defines the file property of the driving information. The file property of the driving information is the file type of the driving information. For example, all of the file types of the first driving information Ml, the second driving information M2 and the third driving information M3 are image types. Since the size of the image type file is larger, the wireless transmission module with higher wireless transmission capability has the higher priority to be selected. In other words, the wireless transmission type priorities of the image types assigned by the control unit 145 are sequentially the Wi-Fi wireless transmission module, the 3G/4G wireless transmission module and the Bluetooth wireless transmission module. Moreover, the file type of fourth driving information M4 is the text type. Since the size of the text type is smaller, the wireless transmission module with lower wireless transmission capability is feasible. In other words, the wireless transmission type priorities of the image types assigned by the control unit 145 are sequentially the Bluetooth wireless transmission module, the 3G/4G wireless transmission module and the Wi-Fi wireless transmission module.

The relationships between the file properties and the wireless transmission type priorities are listed in the following table.

|  | Image type | Text type |
| --- | --- | --- |
| First priority | Wi-Fi wireless transmission module | Bluetooth wireless transmission module |
| Second priority | 3G/4G wireless transmission module | 3G/4G wireless transmission module |
| Third priority | Bluetooth wireless transmission module | Wi-Fi wireless transmission module |

In an embodiment, the file property of the driving information is judged according to the file size of the driving information. Moreover, a first size range and a second size range are previously stored in the control unit 145. If the file size is in the first size range, the control unit 145 judges that the file property of the driving information belongs to the image type. If the file size is in the second size range, the control unit 145 judges that the file property of the driving information belongs to the text type. The file property of the driving information is included in the corresponding wireless transmission request. Consequently, before the wireless transmission starts, the file property of the driving information to be transmitted is realized by the control unit 145.

An example of operating the vehicular projection system 1 will be described in more details as follows. Please refer to FIGS. 1~5 and FIG. 6A and 6B. Before driving the vehicle, the driver turns on the vehicular projection system 1. Consequently, the first information collector 11, the second information collector 12 and the third information collector 13 are enabled, and the time-division multiplexing device 14 is wirelessly connected with the first information collector 11, the second information collector 12, the third information collector 13 and the projection mechanism 15 according to wireless transmission technologies. After the vehicle is started, the driving status information of the vehicle is shown on the display device 111 of the first information collector 11. In addition, the first image pickup device 112 shoots the display device 111 and acquires the image corresponding to the driving status information, and thus the first driving information M1 is generated. After the first driving information M1 is generated, the fourth wireless transmission module 113 issues the first wireless transmission request R1 to the first wireless transmission module 142 according to the first wireless transmission technology. In response to the first wireless transmission request R1, the time-division multiplexing device 14 realizes that the wireless transmission is requested and performs the communicating operation prior to the wireless transmission. The first wireless transmission request R1 contains the file property of the first driving information M1.

Moreover, the navigation module 121 of the second information collector 12 is connected to the internet to acquire the navigation information about the present location of the vehicle. Consequently, the second driving information M2 is generated. The wireless transmission module with the highest wireless transmission capability is the default wireless transmission module of the second information collector 12 to perform the communicating operation prior to the wireless transmission. Consequently, the fifth wireless transmission module 122 issues the second wireless transmission request R2 to the first wireless transmission module 142 according to the first wireless transmission technology. In response to the second wireless transmission request R2, the time-division multiplexing device 14 realizes that the wireless transmission is requested.

The operations of the third information collector 13 are similar to the operations of the first information collector 11 and the second information collector 12. That is, the eighth wireless transmission module 132 issues the third wireless transmission request R3 to the second wireless transmission module 143 according to the second wireless transmission technology.

Please refer to FIGS. 1 and 2 again. After the vehicular projection system 1 is turned on, the control unit 145 performs the step A. That is, the control unit 145 of the time-division multiplexing device 14 detects whether a wireless transmission request is received. If no wireless transmission request is received by the time-division multiplexing device 14, the step A is repeatedly done at the first predetermined time interval (e.g. 10 ms). After the first wireless transmission request R1, the second wireless transmission request R2 and the third wireless transmission request R3 are received by the time-division multiplexing device 14 sequentially, the control unit 145 performs the step B of judging the number of the received wireless transmission request. Since the number of the received wireless transmission request is 3, the control unit 145 performs the step C. That is, the transmitting sequence of the plural wireless transmission requests is determined. The transmitting sequence is determined according to the sequence of receiving the wireless transmission requests. For example, the first wireless transmission request R1, the second wireless transmission request R2 and the third wireless transmission request R3 are sequentially received by the time-division multiplexing device 14. Consequently, in the step C, the transmitting sequence of the plural wireless transmission requests determined by the control unit 145 is the first wireless transmission request R1, the second wireless transmission request R2 and the third wireless transmission request R3 in order.

Then, the control unit 145 performs the step D2. That is, plural ideal wireless transmission types are assigned according to plural file properties. The control unit 145 reads the file property of the first driving information M1 corresponding to the first wireless transmission request R1 according to the sequence of receiving the wireless transmission requests. Since the file property of the first driving information M1 is the image type, the first wireless transmission module 142 is assigned to the first information collector 11 corresponding to the first wireless transmission request R1 according to the above table about the relationships between the file properties and the wireless transmission type priorities. That is, the ideal wireless transmission type for the first driving information M1 is the Wi-Fi wireless transmission module. Similarly, the control unit 145 reads the file property of the second driving information M2 corresponding to the second wireless transmission request R2 and the reads the file property of the third driving information M3 corresponding to the third wireless transmission request R3. Consequently, the Wi-Fi wireless transmission module is assigned to the second information collector 12, and the Wi-Fi wireless transmission module is assigned to the third information collector 13.

After the step D2, the control unit 145 performs the step E2. That is, the control unit 145 judges whether the ideal wireless transmission type is available. In the step E2, the control unit 145 sequentially judges whether the ideal wireless transmission types corresponding to the first wireless transmission request R1, the second wireless transmission request R2 and the third wireless transmission request R3 are available. Since the sequence of transmitting the first wireless transmission request R1 is in the first order, the first wireless transmission module 142 is not available. Since the first information collector 11 has the Wi-Fi wireless transmission capability, the control unit 145 judges that the ideal wireless transmission type corresponding to the first wireless transmission request R1 is available.

The sequence of transmitting the second wireless transmission request R2 is in the second order. Since the first wireless transmission module 142 of the time-division multiplexing device 14 is being used by the first information collector 11, the control unit 145 judges that the ideal wireless transmission type corresponding to the second wireless transmission request R2 is not available. Then, the control unit 145 performs the step E3 of assigning a real wireless transmission type according to the wireless transmission capability corresponding to the second wireless transmission request R2. Since the optimized available wireless transmission module for the second information collector 12 is the 3G/4G wireless transmission module (i.e., the sixth wireless transmission module 123) at this moment, the second wireless transmission module 143 is assigned to the second information collector 12 corresponding to the second wireless transmission request R2 by the control unit 145.

The sequence of transmitting the third wireless transmission request R3 is in the third order. As mentioned above, the third information collector 13 only has the 3G/4G wireless transmission capability. Since the second wireless transmission module 143 of the time-division multiplexing device 14 is being used by the second information collector 12, the control unit 145 judges that the ideal wireless transmission type corresponding to the third wireless transmission request R3 is not available. Then, the control unit 145 performs the step E3 of assigning a real wireless transmission type according to the wireless transmission capability corresponding to the third wireless transmission request R3. Since the third information collector 13 only has the 3G/4G wireless transmission capability, the second wireless transmission module 143 (i.e., the wireless transmission module with the 3G/4G wireless transmission type) is assigned to the third information collector 13 corresponding to the third wireless transmission request R3 by the control unit 145. However, the wireless transmission of the third driving information M3 of the third information collector 13 is performed after the wireless transmission of the second driving information M2 of the second information collector 12 is performed.

In the step E2 and the step E3, the control unit 145 can determine the wireless transmission technologies that are adopted by the first information collector 11, the second information collector 12 and the third information collector 13. After the wireless transmission technologies are determined, the control unit 145 notifies the first information collector 11, the second information collector 12 and the third information collector 13 to perform the wireless transmission. That is, the step F2 is performed. Meanwhile, the wireless transmission of the third information collector 13 has not been started.

After the step F2, the first driving information M1 is wirelessly transmitted from the fourth wireless transmission module 113 of the first information collector 11 to the first wireless transmission module 142, and the second driving information M2 is wirelessly transmitted from the sixth wireless transmission module 123 of the second information collector 12 to the second wireless transmission module 143. During the wireless transmission, the control unit 145 performs the step G of judging whether the occupied wireless transmission module becomes available. Meanwhile, the first wireless transmission module 142 and the second wireless transmission module 143 are the occupied wireless transmission module. In the step G the control unit 145 judges whether the first driving information M1 and the second driving information M2 are completely transmitted. Since both of the first driving information M1 and the second driving information M2 are not completely transmitted, the control unit 145 performs the step G again at a second predetermined time interval.

After the first driving information M1 is received by the time-division multiplexing device 14 and stored in the first storage element 141, the control unit 145 re-performs the step G of judging whether the occupied wireless transmission module becomes available. Since the first driving information M1 is completely transmitted, the occupied first wireless transmission module 142 becomes available. Then, the control unit 145 performs the step H of judging whether the wireless transmission type of the incompletely-transmitted driving information has to be changed. In the step H, the control unit 145 judges whether the wireless transmission types of the second driving information M2 and the third driving information M3 have to be changed. As mentioned above, the first wireless transmission module 142 is the ideal wireless transmission module for the second driving information M2. When the first wireless transmission module 142 is occupied, the ideal wireless transmission module is not assigned to the second driving information M2. Meanwhile, since the first wireless transmission module 142 is no longer occupied, the wireless transmission type of the second driving information M2 has to be changed. The ideal wireless transmission module is not assigned to the third driving information M3. Since the third information collector 13 only has the 3G/4G wireless transmission capability, it is not necessary to change the wireless transmission type of the third driving information M3.

After the step H, the control unit 145 performs the step I on the second driving information M2. That is, the wireless transmission type of the second driving information M2 that is being transmitted is changed to the optimized wireless transmission type. That is, the control unit 145 instructs the second information collector 12 to use the fifth wireless transmission module 122 with the Wi-Fi wireless transmission capability to transmit the second driving information M2. On the other hand, the control unit 145 performs the step J on the third driving information M3. That is, the wireless transmission type of the third driving information M3 is not changed. As mentioned above, the second wireless transmission module 143 is the ideal wireless transmission module for the third driving information M3. Since the second wireless transmission module 143 is no longer occupied, the wireless transmission of the third driving information M3 starts. That is, the third driving information M3 is wirelessly transmitted from the eighth wireless transmission module 132 to the second wireless transmission module 143.

Figure 7:
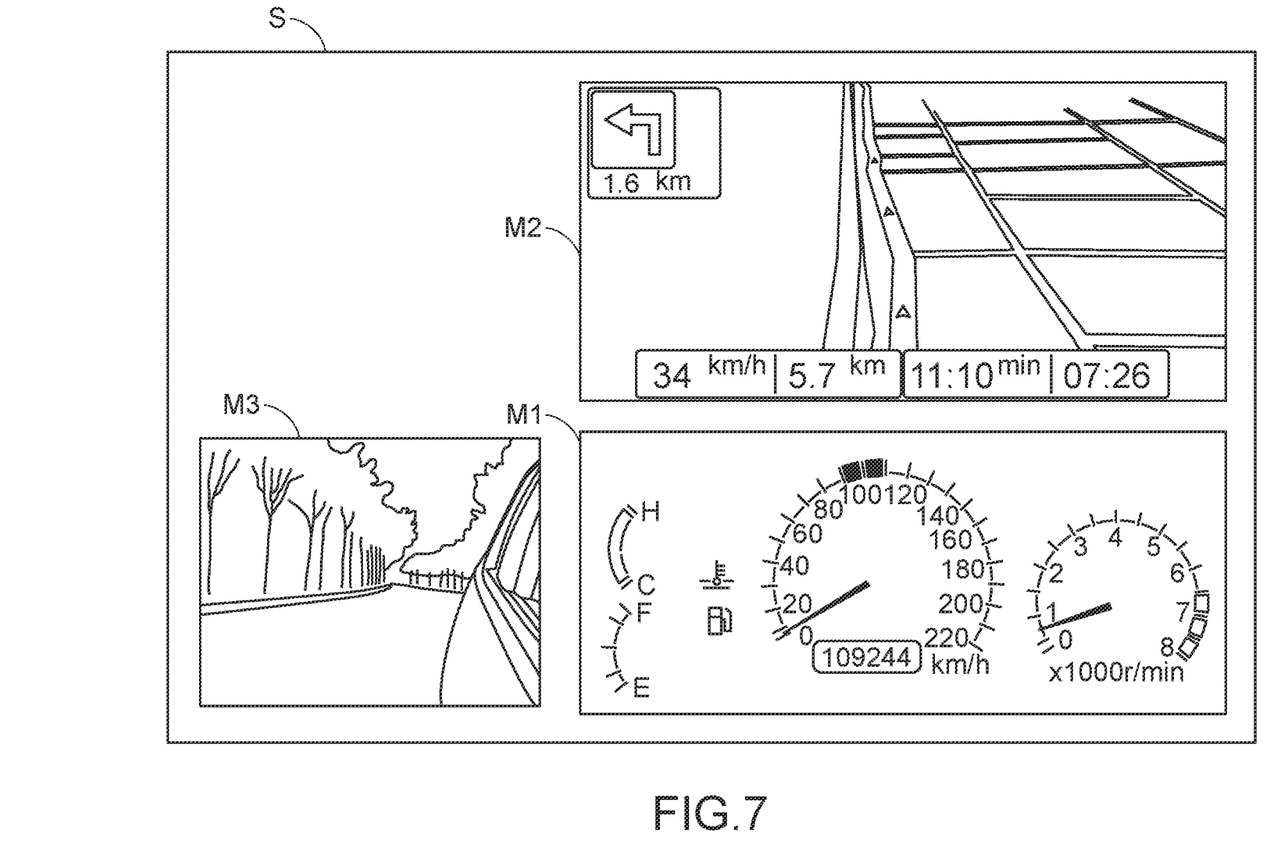
FIG. 7 schematically illustrates the layout image that is generated by the vehicular projection system according to the embodiment of the present invention.

After the first driving information M1, the second driving information M2 and the third driving information M3 are received by the time-division multiplexing device 14, the control unit 145 loads the first driving information M1, the second driving information M2 and the third driving information M3 into a preset layout area. Consequently, the layout image S is generated. A schematic view of the layout image S is shown in FIG. 7. The preset layout area can be previously set. In another embodiment, the preset layout area is set according to the driver's requirements. After the layout image S is generated, the layout image S is outputted from the time-division multiplexing device 14 to the ninth wireless transmission module 151 through any wireless transmission module. After the layout image S is received by the projection mechanism 15, the layout image S is stored in the second storage element 152. Moreover, the layout image S is projected onto the glass plate 101 of the vehicle by the projection mechanism 15. Consequently, the driver can watch both of the traffic condition and the layout image S while driving the vehicle. Under this circumstance, the time period of leaving the vision line from the glass plate 101 is decreased.

The operations of the vehicular projection system 1 in a different usage scenario will be described as follows. Please refer to FIGS. 1-6 again. In an usage scenario, the second information collector 12 intends to transmit the fourth driving information M4 (in a text type of the file property), the third information collector 13 intends to transmit the third driving information M3, and the first information collector 11 intends to transmit the first driving information M1. The vehicular projection system 1 performs the following operations. Firstly, the control unit 145 performs the steps A, B and C to determine the sequences of transmitting the corresponding wireless transmission requests. For example, the transmitting sequence of the plural wireless transmission requests determined by the control unit 145 is the second wireless transmission request R2 corresponding to the fourth driving information M4, the third wireless transmission request R3 corresponding to the third driving information M3 and the first wireless transmission request R1 corresponding to the first driving information M1 in order. Then, in the step D2, the control unit 145 assigns the Bluetooth wireless transmission module to the second information collector 12, assigns the Wi-Fi wireless transmission module to the third information collector 13, and assigns the Wi-Fi wireless transmission module to the first information collector 11.

After the ideal wireless transmission type corresponding to each wireless transmission request is determined, the step E2 and the step E3 are performed. Since the third information collector 13 only has the 3G/4G wireless transmission capability, the 3G/4G wireless transmission module is the real wireless transmission type assigned by the control unit 145. In this embodiment, the first information collector 11 has the lower order than the third information collector 13 in the transmitting sequence. However, since the Wi-Fi wireless transmission module is not occupied by the third information collector 13, the Wi-Fi wireless transmission module is assigned to the first information collector 11 to perform the wireless transmission. In other words, the second information collector 12 wirelessly transmits the fourth driving information M4 through the Bluetooth wireless transmission module, the third information collector 13 wirelessly transmits the third driving information M3 through the 3G/4G wireless transmission module, and the first information collector 11 wirelessly transmits the first driving information M1 through the Wi-Fi wireless transmission module.

In case that only a single wireless transmission request is received by the time-division multiplexing device 14 in the step B, the control unit 145 sequentially performs the step D1, the step E1 and the step F1 to start the wireless transmission. The detailed operations are similar to those mentioned above, and are not redundantly described herein.

After the wireless transmission method is determined, the control unit 145 notifies the first information collector 11, the second information collector 12 and the third information collector 13 to perform the wireless transmission. That is, the step F2 is performed. Consequently, the first information collector 11, the second information collector 12 and the third information collector 13 can be in wireless communication with the time-division multiplexing device 14 according to different wireless transmission technologies. During the wireless transmission, the control unit 145 performs the step G, the step H and the step I (or the step J).

From the above descriptions, the present invention provides the vehicular projection system. The time-division multiplexing device determines the transmitting sequence of plural information collectors according to the receiving sequence of the wireless transmission requests from the plural information collectors. Then, the control unit determines the suitable wireless transmission modules according to the file properties of the driving information to be transmitted and the wireless transmission capabilities of the plural information collectors. That is, the plural information collectors can simultaneously transmit driving information to the time-division multiplexing device through different wireless transmission modules. Consequently, the wireless transmission is performed efficiently. In case that the best wireless transmission module (with the highest transmission speed) is occupied when plural wireless transmission modules simultaneously perform the wireless transmission, the second best wireless transmission module is assigned to perform the wireless transmission. When the best wireless transmission module is no longer occupied, the second best wireless transmission module is switched to the best wireless transmission module to perform the wireless transmission. Consequently, the wireless transmission efficiency is enhanced. Moreover, since the layout image watched by the driver is close to the real-time image, the vehicular projection system can effectively solve the display lag problem.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A vehicular projection system for a vehicle, the vehicular projection system comprising:
a first information collector issuing a first driving information and a first wireless transmission request corresponding to the first driving information;
a second information collector issuing a second driving information and a second wireless transmission request corresponding to the second driving information;
a time-division multiplexing device wirelessly connected with the first information collector and the second information collector, and determining a wireless transmission method of at least one of the first driving information and the second driving information according to a result of detecting the first wireless transmission request and the second wireless transmission request, wherein after the first driving information and the second driving information are received, the time-division multiplexing device generates a layout image according to the first driving information and the second driving information and outputs the layout image, wherein the time-division multiplexing device comprises:
a first storage element temporarily storing the first driving information and the second driving information;
a fist wireless transmission module connected with the first storage element, and receiving the first driving information or the second driving information according to a first wireless transmission technology;
a second wireless transmission module connected with the first storage element, and receiving the second driving information according to a second wireless transmission technology; and
a control unit connected with the first storage element, the first wireless transmission module and the second wireless transmission module, wherein the control unit determines the wireless transmission method of the at least one of the first driving information and the second driving information according to a receiving sequence of the first wireless transmission request and the second wireless transmission request, a file property of the first driving information corresponding to the second wireless transmission request, a file property of the second driving information corresponding to the second wireless transmission request, a wireless transmission capability information corresponding to the first wireless transmission request and wireless transmission capability information corresponding to the second wireless transmission request; and
a projection mechanism wirelessly connected with the time-division multiplexing device, and projecting the layout image onto a glass plate of the vehicle, wherein the layout image contains the first driving information and the second driving information.

2. The vehicular projection system according to claim 1, wherein when the control unit detects that at least one of the first wireless transmission request and the second wireless transmission request is received, the control unit judges a number of the received wireless transmission request, wherein if the number of the received wireless transmission request is 1, the control unit assigns an ideal wireless transmission type according to the file property corresponding to the first wireless transmission request or the file property corresponding to the second wireless transmission request, wherein if the number of the received wireless transmission request is larger than 1, the control unit determines a transmitting sequence of the first wireless transmission request and the second wireless transmission request according to the receiving sequence of the first wireless transmission request and the second wireless transmission request, and the control unit assigns ideal wireless transmission types according to the file property corresponding to the first wireless transmission request and the file property corresponding to the second wireless transmission request.

3. The vehicular projection system according to claim 2, wherein the file property corresponding to the first wireless transmission request is a file type of the first driving information, and the file property corresponding to the second wireless transmission request is a file type of the second driving information, wherein if a default file type is an image type, a Wi-Fi wireless transmission module is the ideal wireless transmission type assigned by the control unit, wherein if the default file type is a text type, a Bluetooth wireless transmission module is the ideal wireless transmission type assigned by the control unit.

4. The vehicular projection system according to claim 2, wherein after the ideal wireless transmission type is assigned, the control unit assigns a real wireless transmission type according to the wireless transmission capability corresponding to the at least one of the first wireless transmission request and the second wireless transmission request, and the control unit notifies at least one of the first information collector and the second information collector to perform wireless transmission.

5. The vehicular projection system according to claim 4, wherein after the at least one of the first driving information and the second driving information is received by the time-division multiplexing device, the control unit judges whether the first driving information or the second driving information having the highest order in the transmitting sequence is completely transmitted, wherein if the first driving information or the second driving information is completely transmitted, the control unit judges whether a wireless transmission type of the driving information with a second highest order in the transmitting sequence has to be changed.

6. The vehicular projection system according to claim 1, wherein the first information collector comprises:
a display device, wherein a driving status information of the vehicle is shown on the display device;
an image pickup device located near the display device, and acquiring an image corresponding to the driving status information; and
a third wireless transmission module connected with the image pickup device and wirelessly connected with the first wireless transmission module, wherein the third wireless transmission module issues the first wireless transmission request and the first driving information to the first wireless transmission module according to the first wireless transmission technology, wherein the first driving information is the image corresponding to the driving status information.

7. The vehicular projection system according to claim 6, wherein the display device is a driving dashboard of the vehicle, and the driving status information contains a driving speed, a cabinet temperature, a gearshift status and a gasoline capacity of the vehicle.

8. The vehicular projection system according to claim 1, wherein the second information collector comprises:
a navigation module acquiring a navigation information;
a fourth wireless transmission module connected with the navigation module and wirelessly connected with the first wireless transmission module, wherein the fourth wireless transmission module issues the second wireless transmission request and the second driving information to the first wireless transmission module according to the first wireless transmission technology; and
a fifth wireless transmission module connected with the navigation module and wirelessly connected with the second wireless transmission module, wherein the fifth wireless transmission module issues the second wireless transmission request and the second driving information to the second wireless transmission module according to the second wireless transmission technology, wherein the second driving information is the navigation information.

9. The vehicular projection system according to claim 8, wherein the first wireless transmission module and the fourth wireless transmission module are Wi-Fi wireless transmission module, and the second wireless transmission module and the fifth wireless transmission module are Bluetooth wireless transmission module.

10. The vehicular projection system according to claim 1, wherein the projection mechanism comprises:
a sixth wireless transmission module wirelessly connected with the time-division multiplexing device, and receiving the layout image;
a second storage element connected with the sixth wireless transmission module, and storing the layout image; and
a projection module connected with the second storage element, and projecting the layout image onto the glass plate of the vehicle.

* * * * *